Jan. 7, 1941.  F. L. MAIN  2,227,838
HYDRAULIC ACTUATOR
Filed Dec. 5, 1938
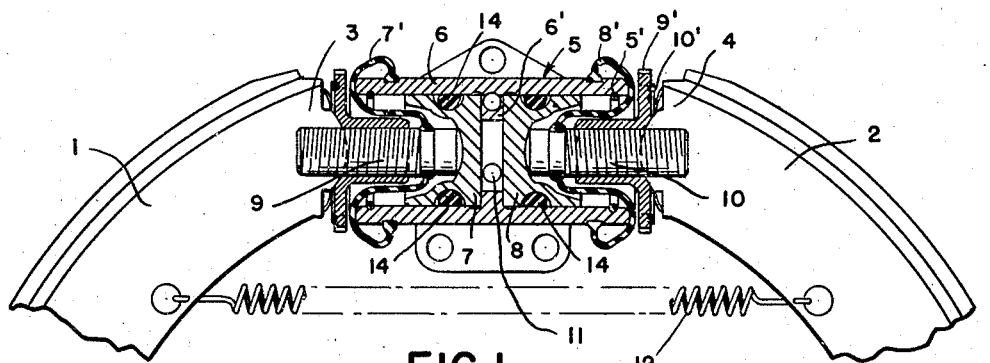
FIG. I.
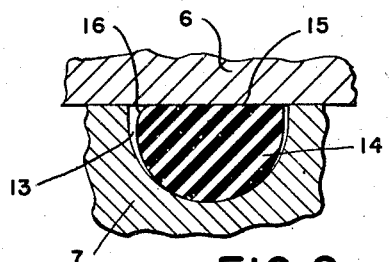
FIG. 2.
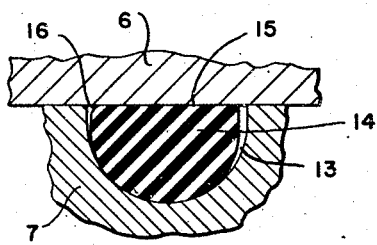
FIG. 3.
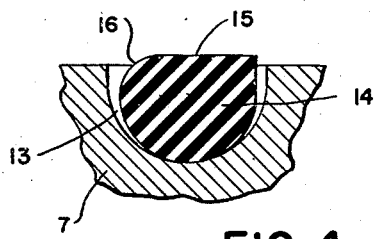
FIG. 4.
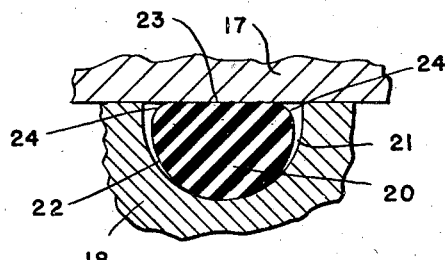
FIG. 6.
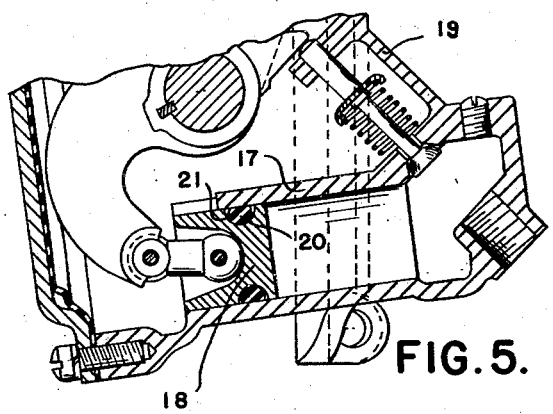
FIG. 5.
INVENTOR
FRANK L. MAIN
BY
ATTORNEYS Patented Jan. 7, 1941

2,227,838

UNITED STATES PATENT OFFICE 2,227,838

HYDRAULIC ACTUATOR

Frank L. Main, Birmingham, Mich., assignor to Kelsey-Hayes Wheel Company, Detroit, Mich., a corporation of Delaware Application December 5, 1938, Serial No. 244,073

4 Claims. (Cl. 309—23)

The invention relates to hydraulic actuators and refers more particularly to hydraulic devices for use in actuating brakes of motor vehicles.

The invention has for one of its objects to provide a simple construction of hydraulic actuator comprising a cylinder and piston and packing means effectively preventing leakage of liquid between the cylinder and piston.

The invention has for another object to so construct the cylinder, piston and packing means that the effectiveness of the latter is maintained throughout practically the life of the material forming the packing means.

The invention has for a further object to provide an improved construction of packing ring which is deformable during the operation of the hydraulic actuator to provide an effective seal and which is arranged to be subjected to a minimum abrading action.

The invention has for other objects the novel features of construction as more fully hereinafter set forth.

In the drawing:

Figure 1 is a sectional elevation of a hydraulic actuator illustrating an embodiment of my invention;

Figure 2 is an enlarged sectional view of a portion thereof;

Figure 3 is a similar view illustrating the action of the packing ring when subjected to liquid pressure;

Figure 4 is an enlarged sectional view illustrating the position of the packing ring when initially assembled with the grooved member;

Figure 5 is a view similar to Figure 1 illustrating another embodiment of my invention;

Figure 6 is an enlarged sectional view of a portion thereof.

The hydraulic actuator, as illustrated particularly in Figure 1, is located at the brake end of the hydraulic brake system of the motor vehicle and is commonly known as a wheel cylinder. It is constructed to be suitably mounted upon a bracket or backing plate between the operating ends of a brake device. As illustrated, the brake device comprises the brake shoes 1 and 2 having the spaced ends 3 and 4 respectively. The hydraulic actuator or wheel cylinder 5 is located between the ends 3 and 4 and comprises the cylindrical housing or cylinder 6 and the opposed pistons 7 and 8 reciprocable within the cylinder and adapted in normal position to abut the centering projection 6' which is integral with and extends radially inwardly from the wall of the cylinder 6. 9 and 10 are rods abutting the outer sides of the heads of the pistons 7 and 8 respectively and bifurcated at their outer ends to embrace the shoe ends 3 and 4 respectively, the bottoms of the slots forming the furcations being spaced from the shoe ends. The ends of the rods and the outer sides of the piston heads have respectively spherical convex and concave bearing surfaces to center the rod ends in alignment with the center line of the pistons. Adjustment nuts 9' threaded upon the rods have at their outer ends spherical concave surfaces for seating upon arcuate convex bearing surfaces of the same radii upon the brake shoe ends 3 and 4. The nuts are held from accidental turning by spring stampings 10' between the nuts and the brake shoe ends. The stampings loosely fit over and are held from turning by the portions of the brake shoe ends having the arcuate bearing surfaces. The stampings have depressions registering in notches in the nuts and spring tongues engaging the brake shoe ends. 5' are guard rings in the cylinder for preventing accidental disengagement of the pistons and 7' and 8' are rubber dust boots encircling the ends of the cylinder and the rods 9 and 10 respectively near their inner ends. The hydraulic liquid under pressure is admitted to the space between the opposed heads of the pistons through a suitable port 11 in the cylinder. Suitable spring means, such as the retractile spring 12 connected to the shoes 1 and 2, serves to hold the shoes in their retracted or inoperative position, which in turn hold the pistons 7 and 8 in normal position as determined by the centering projection 6'.

For the purpose of providing an effective seal between the piston and the cylinder to prevent the escape of the braking liquid, I have provided packing rings which may be carried by either the pistons or the cylinder. As specifically shown, the packing rings are carried by the pistons. Each piston is provided with the annular groove 13 which is of generally semi-circular section and which opens toward the cylinder. Specifically, the center of the semi-circular portion of the annular groove is spaced radially inwardly from the outer diameter of the piston and the portions of the wall of the annular groove radially outwardly of the semi-circular portion are tangent to the semi-circular portion. 14 is the packing ring extending within the annular groove 13. The ring is formed of a material which is non-compressible, or at least non-compressible to practically the same extent as liquid. The material is resilient and tends to maintain its normal shape and at the same time is deformable. The ring is preferably formed of rubber which may be either organic or synthetic. The ring is also of generally semi-circular section and comprises a portion which is of semi-circular section and has a radius which is less than that of the semi-cylindrical portion of the groove. The inner diameter of the ring is equal to or very slightly less than the smallest outer diameter of the groove. The ring has a portion which extends radially outwardly beyond the piston and this portion is formed with the flat or cylindrical face 15 for engaging the cylinder. The normal diameter of this face is greater than the internal diameter of the cylinder. The ring illustrated in Figures 1 to 4 inclusive has a square corner at the junction of the face 15 and the pressure end. However, at the axially outer end or the end opposite the pressure end there is a gradual junction of the face 15 and the axially outer end. In other words, there is the curved or arcuate face 16 connecting the face 15 with the semi-circular face of the ring.

Figure 4 illustrates the ring when initially assembled in the annular groove of a piston and it will be noted that there is clearance between the ends of the ring and the opposite portions of the wall of the groove and that this clearance gradually decreases to the bottom of the groove. It will also be noted that the outer diameter of the ring is greater than that of the piston.

Figure 2 illustrates the ring after its assembly with the piston and the assembly of the piston with the cylinder. It will be noted from this view that the outside diameter of the ring has been reduced and the material of the ring has been deformed so that its width has been increased to increase the extent of the flat or cylindrical face engaging the cylinder. It will also be noted that the radius of the semi-circular portion of the ring has been increased, but is still less than that of the semi-circular portion of the groove. As a result, there is still clearance between the ends of the ring and the opposite portions of the wall of the groove. It will be further noted that the semi-circular face of the ring is connected to the flat or cylindrical face by an arcuate face so that there is no sharp edge at the axially outer end of the ring.

Figure 3 illustrates the ring when subjected to pressure, the piston at this time having been moved axially outwardly in the cylinder by the braking liquid forced into the cylinder to apply the brake. It will be noted that the material of the ring has been further deformed and moved against the axially outer side of the wall of the groove by reason of the liquid under pressure contacting with the pressure end of the ring and also radially outwardly against the cylinder, the inclined part near the bottom of the wall of the groove serving to wedge the material in this direction. As a result, the ring has greater effective sealing properties. It will be further noted that at this time the flat or cylindrical face of the ring in engagement with the cylinder has moved axially outwardly longitudinally of the piston and along the ring from the position as illustrated in Figure 2.

Upon release of the liquid pressure and retraction of the pistons to their normal or inoperative positions, the material of the ring resumes its normal position, as shown in Figure 2.

With the above construction, a new line of contact of the ring with the cylinder is formed on the ring for each change in pressure and since there is no abrupt interruption of the ring's surface between its zones of contact with the piston and cylinder at the axially outer end of the ring there is no sharp or abrupt edge formed on the ring so that the abrading action is reduced to the minimum and is negligible and the efficiency of the ring lasts for the life of its material. Furthermore, at low operating pressures the preloading of the ring is low and its frictional resistance to movement is also low. However, as the pressure in the system increases, the ring's radial load increases owing to the shape of the groove in which the ring oscillates and the sealing pressure exerted by the ring is proportional to the pressure in the system. Therefore, the ring presents an effective seal at all times.

Figures 5 and 6 illustrate another embodiment of my invention in which the hydraulic actuator is located at the foot pedal end of the hydraulic system and is commonly known as a master cylinder. The master cylinder comprises the cylinder 17 and the piston 18 reciprocable within the cylinder. The cylinder is preferably integral with the reservoir 19 and the piston is adapted to be suitably connected to a foot pedal. The construction of master cylinder illustrated is the same as that embodied in my copending application Serial No. 202,787, filed April 18, 1938.

For the purpose of providing an effective seal between the piston and the cylinder to prevent the escape of the braking liquid, I have provided the packing ring 20 which may be carried by either the piston or the cylinder. As shown, the packing ring is carried by the piston which is provided with the annular groove 21 formed in the same manner as the annular groove 13 of Figures 1 to 4 inclusive. The packing ring 20 is constructed in the same manner as the packing ring 14, with the exception that the packing ring 20 has no abrupt or square corner at its pressure end. In detail, the packing ring 20 has a radially inner portion which is formed with a semi-circular face 22 and a radially outer portion which is formed with the flat or cylindrical surface 23 and the axially inner and outer portions which are formed with the like arcuate faces 24 connecting the semi-circular face and the radially outer face so that the ring's surface has no abrupt interruption. With this symmetrical arrangement of ring, it may be assembled with the pistons with either end forming the pressure end.

The operation of this ring is the same as that illustrated in Figures 1 to 4 inclusive.

What I claim as my invention is:

1. In a hydraulic actuator, a cylinder member, a piston member within said cylinder member, said members being relatively reciprocable, one of said members having an annular groove of generally semi-circular section opening toward the other of said members, and an endless deformable packing ring of generally semi-circular section extending within said groove, said ring in its natural condition having a portion of generally semi-circular section of smaller radius than that of said groove and provided with a generally semi-circular face, a second portion provided with a substantially cylindrical face connecting into said generally semi-circular face at the pressure end of said ring, said second portion having a diameter to locate said substantially cylindrical face beyond the surface of said member having the groove, and a third portion provided with a convex face connecting said generally semi-circular face and substantially cylindrical face at the end of said ring opposite the pressure end, said ring upon assembly of said cylinder and piston members substantially maintaining its shape and providing axial clearance between at least one of its ends and the adjacent wall of said groove.

2. In a hydraulic actuator, a cylinder member, a piston member within said cylinder member, said members being relatively reciprocable, one of said members having an annular groove of generally semi-circular section opening toward the other of said members and an endless resilient deformable packing ring of generally semi-circular section extending within said groove, said ring having a portion of generally semi-circular section of smaller radius than that of said groove and provided with a generally semi-circular face, a second portion provided with a substantially cylindrical face, said second portion having a diameter to locate said substantially cylindrical face beyond the surface of said member having the groove, a third portion provided with a substantially radial face connecting said generally semi-circular face and substantially cylindrical face at the pressure end of said ring, and a fourth portion provided with a convex arcuate face connecting said generally semi-circular face and substantially cylindrical face at the end of said ring opposite the pressure end, said ring providing axial clearance between at least one of its ends and the adjacent wall of said groove.

3. In a hydraulic actuator, a cylindrical member, a piston member within said cylindrical member, said members being relatively reciprocable, one of said members having an annular groove opening toward the other of said members and said groove having an axially outer wall portion flaring from the bottom of said groove, and an endless deformable packing ring in said groove, said ring having a portion with an inclined axially outer face for cooperating with said flaring axially outer wall portion, a second portion provided with a substantially cylindrical face, said portion being of a diameter to extend radially beyond the surface of said member having the groove, a third portion having a convex arcuate face at the axially outer end of said ring connecting said inclined axially outer face and substantially cylindrical face, and a fourth portion provided with a generally radial face at the axially inner or pressure end of said ring and extending from said substantially cylindrical face, said ring providing axial clearance between at least one of its ends and the adjacent wall of said groove.

4. In a hydraulic actuator, a cylinder member, a piston member within said cylinder member, said members being relatively reciprocable, one of said members having an annular groove opening toward the other of said members, and a deformable packing ring extending within and radially beyond said groove, said ring having a preformed substantially cylindrical face engaging the other of said members, a preformed substantially radial face at the pressure end of said ring extending from said substantially cylindrical face and a preformed curved face at the end of said ring opposite the pressure end and curved toward the pressure end and said substantially cylindrical face and connecting into the latter.

FRANK L. MAIN.